M. LEITCH.
SPOOL.
APPLICATION FILED OCT. 31, 1908.
976,381.
Patented Nov. 22, 1910.
2 SHEETS—SHEET 1.
Fig. 1.
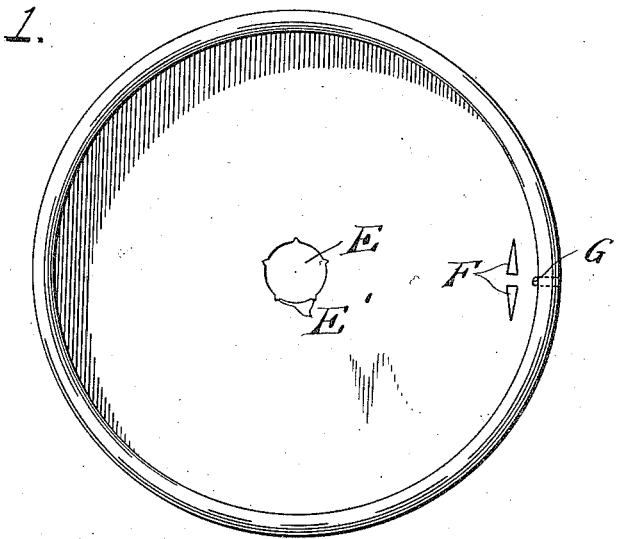
Fig. 2.
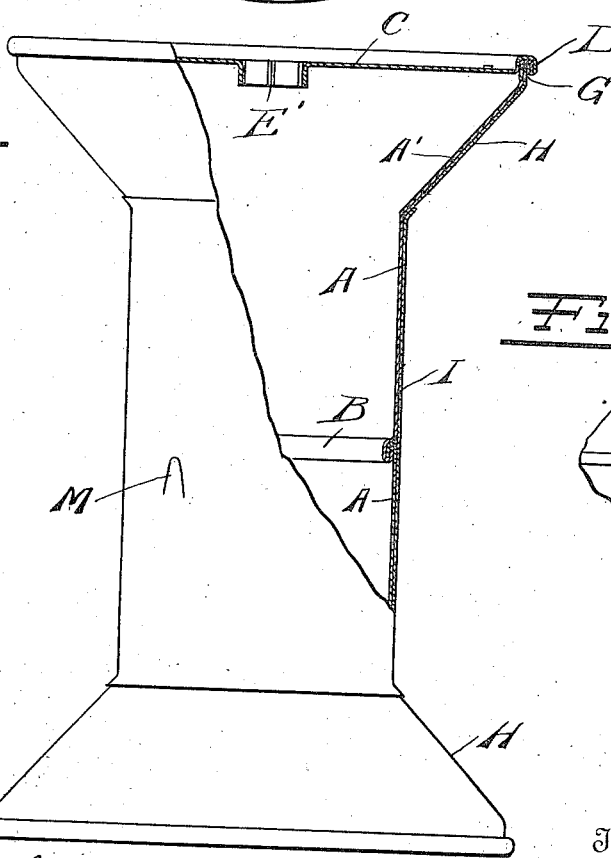
Fig. 3.
Witnesses:
Chas. A. Beard
Fred. G. Dannenfelser
Inventor
MEREDITH LEITCH
By his Attorneys
Bartlett, Brownell & Mitchell M. LEITCH.
SPOOL.
APPLICATION FILED OCT. 31, 1908.
976,381.
Patented Nov. 22, 1910.
2 SHEETS—SHEET 2.
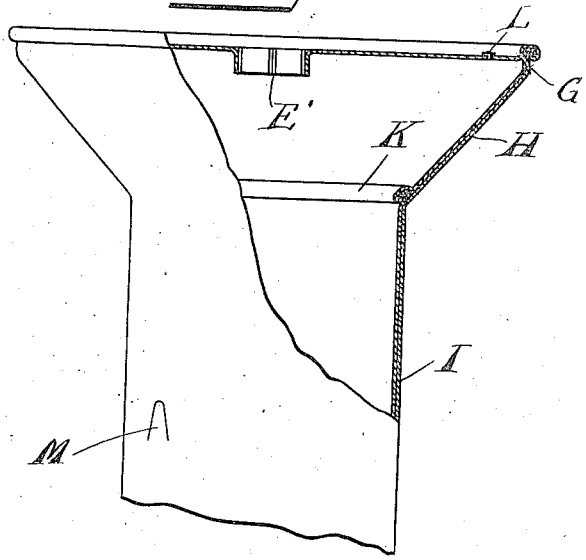
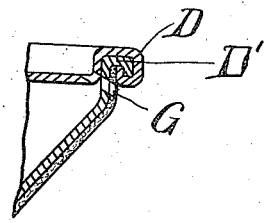
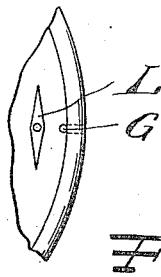
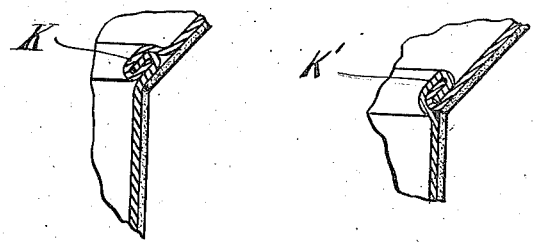
Witnesses:
Inventor
MEREDITH LEITCH
By his Attorneys

UNITED STATES PATENT OFFICE.

MEREDITH LEITCH, OF SPRINGFIELD, MASSACHUSETTS, ASSIGNOR TO THE AMERICAN THREAD COMPANY, A CORPORATION OF NEW JERSEY.

SPOOL.

976,381. Specification of Letters Patent. Patented Nov. 22, 1910.

Application filed October 31, 1908. Serial No. 460,431.

*To all whom it may concern:*

Be it known that I, MEREDITH LEITCH, a citizen of the United States, residing at Springfield, county of Hampden, State of Massachusetts, have invented certain new and useful Improvements in Spools, of which the following is a full, clear, and exact description.

My invention relates to improvements in spools, and has for its object to produce a substitute for the wooden spool heretofore generally used. On account of the great number of spools required, the cost of wooden spools has gradually risen, due in part to the increasing price of material used, and there has been a great demand for a spool made wholly or partially of some other material which will be practical and inexpensive to manufacture and use.

In addition to producing a substitute for the wooden spool, my invention has for its object to produce a spool having a metallic base in which corrosion and damage to the thread shall be prevented. Second, to provide such a spool with a suitable surface for winding, so that the thread will cling thereto. Third, to provide such a spool with a surface against which the guide may strike at the ends of its stroke without injury to the guide or the surface. Fourth, to produce a metallic spool in which the end of the thread can be easily secured. Fifth, to provide a spool having a smooth metallic unwinding edge, and sixth, to produce a spool in which the thread, when secured, will not pass over the edge of either end or lie in a notch therein.

The following is a description of the embodiment of my invention, reference being had to the accompanying drawings, in which—

Figure 1 represents a plan view of one end of the spool. Fig. 2 is a side elevation of the spool partly in section. Fig. 3 is a detail of a modification. Fig. 4 is a partial side elevation partly in section showing a modification. Fig. 5 is an enlarged detail of the spool of both Figs. 2 and 4. Fig. 6 is a detail of the spool of Fig. 4. Fig. 7 is an enlarged detail of the spool of Fig. 4. Fig. 8 is a joint that may be used instead of that of Fig. 7.

Referring more particularly to the drawings, the spool of Figs. 1 and 2 has a body consisting of two portions A—A drawn or struck up from a single piece of metal so as to be integral with one another, one part being tubular and the other conical. These two portions are joined together at their edges by a locked joint B. Upon the bases of the conical parts of each portion is an end piece C secured by the locked joint D, having an outwardly projecting flange D′ on the conical portion, which the edge of the end closure extends over and embraces. This end piece or closure has a central perforation E provided with internal flanges having grooves E′ for splines upon the driving spindle. The flanges are cut with slits at the apexes of the grooves so that they will yield and hug the spindle passing through them when the spindle is, as it should be, slightly larger than the normal internal diameter of the flange. The flanges thus provide long bearings on the spindle and also hug it. The end piece is provided with struck-up tangs F, under which the end of the thread can be caught, the thread being passed through a perforation G so that it can be fastened without passing over the outside of the joint D. The outer surface, including the upper edges, of the joints D are polished so as to form a smooth surface on which the thread slips easily when unwound by being pulled in the direction of the axis of the spool. Upon the two conical portions of the spool is a covering or surface H, which may be made of paper, cork, sawdust or enamel. When made of cork or sawdust it is preferably cemented on. When made of paper it can be held on without being cemented to the body of the spool. If made of paper, I preferably form coverings for the two conical portions by stamping or pressing the paper into conical form and placing them upon the ends before the two body portions are secured together by the joint D. When the two conical paper portions are upon the conical ends, the spool ends C are applied lapping over the paper on the conical parts and the locked joints D formed, holding the outer ends of the conical paper portions in place in the openings or recesses of the joints. The openings in the two joints face one another and surround the peripheries of the tapered or conical end portions. Fig. 5 shows this locked joint on an enlarged scale. The outer edges of the joints D project so that the covering is protected against abrasion by the thread and against wear due to contact when the spool rests on its side. The cylindrical portion of the spool is covered with a paper portion I, which is secured thereto by a lapped joint completely covering the outer surface of the metallic base. The paper portions H may also be made with a lapped joint instead of being pressed into shape, if desired. In Fig. 3, I have shown at B' a modified locked joint connecting the two cylindrical portions together. The joint shown in Fig. 3 can be used in place of the joint shown in Fig. 2, if desired.

In the modification shown in Fig. 4, the spool is made from five pieces instead of four. The cylindrical portion is a continuous tube and the conical portions are each joined to the ends thereof by a locked joint K. In Fig. 4 the tangs for the thread are formed by a separate piece L riveted or otherwise secured opposite the hole G, instead of being stamped up by the metal. The locked joint K is shown in enlarged detail in Fig. 7. The paper portions H and I of Fig. 4, have abutting edges, that construction being permissible if the paper is carefully applied. M is a tang cut from the paper to catch the thread or start it, if desired. The joints B, B', D and K can be soldered, if desired.

In Fig. 8 is shown a joint K' that may be used instead of the joint K.

It is to be noted that the tapered or conical end portions A' have parts parallel to the axis of the spool, and that the end closures are formed with reëntrant portions having continuous inner and outer surfaces also parallel to the axis of the spool, the outer surfaces engaging the inner surfaces on the parts of the end portions which are parallel to the axis, thus providing endwise projecting flanges on the spool ends.

Spools embodying my invention, as above shown and described, are inexpensive to manufacture and are capable of standing hard usage. They provide good winding surfaces and the edges formed by the joints D provide good surfaces for the thread to run on when unwinding. Damage to the thread by corrosion is prevented and the thread clings to the surface so that it will not crowd down at the end at the point where the guide reverses, and a surface on the inclined flanges against which the guide may strike at the end of its stroke without injury to itself or to the surface is also provided. For some purposes the paper covering can be omitted.

What I claim is:

1. In a spool a metallic spool body, having a cylindrical central portion and two end portions, said end portions having conical surfaces together with outwardly projecting flanges at their bases, and also exposed cylindrical parts adjacent to said flanges, in combination with end closures each remote from the cylindrical portion and extending over one side of one of said flanges and engaging the other side thereof, adjacent to said cylindrical portions.

2. In a spool, the combination of a metallic spool body having a cylindrical portion and conical end portions, a non-metallic covering for said cylindrical and conical portions, and end closures remote from said cylindrical portion and extending beyond the peripheries of said conical portions and the covering thereon.

3. In a spool, the combination of a metallic spool body having a cylindrical portion and conical portions, end closures secured to said conical portions by joints having openings surrounding said conical portions, the opening in the joint securing one end closure facing the opening in the joint securing the other end closure, and a fibrous covering on said cylindrical and conical portions extending into said openings.

4. In a spool, the combination of a metallic body portion consisting of cylindrical and conical parts, end closures secured thereto to the conical parts by locked joints and remote from said cylindrical part, and a paper covering for said body portion secured within the locked joints, said end closures extending outwardly beyond said covering.

5. In a spool, the combination of a metallic spool body having a cylindrical portion and two end portions, said end portions having conical surfaces and at their bases exposed cylindrical portions parallel to the axis of the spool body and surrounding said axis, with end closures having reëntrant surfaces having walls surrounding and parallel to said axis and engaging parallel surfaces on said end portions.

6. In a spool, the combination of a metallic spool body having a cylindrical portion and conical portions, said conical portions having outwardly projecting flanges, and end closures extending over one side of said flanges and engaging the other side, one of said conical portions and the corresponding end closure having a perforation adjacent to the flange on said conical portion, and thread-securing means upon the perforated end closure adjacent to said perforation.

MEREDITH LEITCH.

Witnesses:
 H. B. BROWNELL,
 L. S. JAMES.